United States Patent
Grosspietsch et al.

(10) Patent No.: US 6,454,314 B1
(45) Date of Patent: Sep. 24, 2002

(54) SEAL FOR A PLUG-IN CONNECTION

(75) Inventors: Wolfgang Grosspietsch, Schweinfurt; Olaf Pagels, Bergrheinfeld; Martin Otto, Würzburg; Volker Stampf, Schweinfurt; Thomas Riess, Mürsbach; Dieter Gebauer, Geldersheim; Angelika Ebert, Schweinfurt, all of (DE)

(73) Assignee: Mannesmann Sachs AG, Schweinfurt (DE)

( * ) Notice: Subject to any disclaimer, the term of this patent is extended or adjusted under 35 U.S.C. 154(b) by 0 days.

(21) Appl. No.: 09/421,642

(22) Filed: Oct. 20, 1999

(30) Foreign Application Priority Data

Oct. 20, 1998 (DE) .......................................... 198 48 213

(51) Int. Cl.⁷ .............................................. F16L 39/00
(52) U.S. Cl. ....................... 285/319; 285/322; 285/323; 285/347; 285/379; 285/921
(58) Field of Search .................................. 285/322, 323, 285/319, 921, 379, 347

(56) References Cited

U.S. PATENT DOCUMENTS

| | | | | |
|---|---|---|---|---|
| 2,560,263 A | * | 7/1951 | Wiegand et al. | ............. 285/266 |
| 3,430,990 A | * | 3/1969 | Nelson | ..................... 277/606 |
| 4,422,673 A | * | 12/1983 | Blackford et al. | ............. 285/23 |
| 4,705,304 A | * | 11/1987 | Matsuda et al. | ............. 285/243 |
| 4,725,081 A | | 2/1988 | Bauer | |
| 4,915,421 A | * | 4/1990 | Dennany, Jr. | ................ 285/39 |
| 5,462,313 A | * | 10/1995 | Rea et al. | ..................... 285/21 |
| 5,542,717 A | * | 8/1996 | Rea et al. | ..................... 285/319 |
| 5,573,279 A | * | 11/1996 | Rea et al. | ................... 285/21.1 |
| 5,707,085 A | * | 1/1998 | Kubiak | ..................... 285/86 |
| 5,752,726 A | * | 5/1998 | Fixemer | ..................... 285/39 |
| 5,779,279 A | * | 7/1998 | Bartholomew | ............... 285/93 |
| 5,782,501 A | * | 7/1998 | Brandt | ........................ 285/81 |
| 6,273,478 B1 | * | 8/2001 | Bennett et al. | ............. 285/346 |

FOREIGN PATENT DOCUMENTS

| | | | | |
|---|---|---|---|---|
| DE | 7830404 | | 2/1979 | ........... F16L/47/06 |
| DE | 35 31 926 | | 3/1987 | ........... F16L/37/14 |
| DE | 197 14 801 | | 1/1998 | |
| GB | 1158358 A | * | 7/1969 | ................. 285/379 |

* cited by examiner

Primary Examiner—Katherine A. Matecki
Assistant Examiner—Carlos Lugo
(74) Attorney, Agent, or Firm—Cohen, Pontani, Lieberman & Pavane

(57) ABSTRACT

An elastomeric seal seals a pipe which is held in a push-in part of a plug-in coupling relative to a cylindrical interior surface of a housing of the plug-in coupling, into which the push-in part is pushed together with the pipe. The seal is in prestressed contact with the interior surface of the housing via an outward-facing annular lip and with the pipe via a radially inward-facing annular lip. The elastomeric seal is connectable by positive fitting to the push-in part, this positive fit being lockable by the assembly of the pipe to form a non-releasable connection, the pipe having a cylindrical and uninterrupted exterior circumference in the region of the seal. The joint between the seal and the push-in part is simple to assemble and is lockable by the insertion of the pipe. The connection of the seal to the push-in part may be additionally secured, with certain changes of diameter, by compression of the web-shaped connection between them.

17 Claims, 5 Drawing Sheets

SEAL FOR A PLUG-IN CONNECTION

BACKGROUND OF THE INVENTION

1. Field of the Invention

The present invention relates to an elastomeric seal for sealing a pipe relative to a cylindrical inner surface of a housing in a plug-in coupling. More specifically, the present invention relates to a seal for sealing a pipe that is held in a push-in part of a plug-in coupling relative to the cylindrical inner surface of the housing of the plug-in coupling.

2. Description of the Related Art

A prior art elastic seal for a hydraulic plug-in connection is disclosed in German reference DE 197 14 801 C1. This prior art seal includes a shaped profile on an interior circumferential surface which engages a shaped profile formed on the exterior circumferential surface of the sleeve with a positive fitting to secure the sealing member to the sleeve. At least one exterior sealing lip is formed on the exterior circumferential surface axially in the region of the shaped profile. In the assembled state of the plug-in connection, the exterior sealing lip is in contact with an interior circumferential surface of the coupling with elastic deformation. In this manner, this reference claims that better handling of the plug-type fitting during assembly of the plug-in connection and a better sealing action of the sealing member in the operation of the plug-in connection are ensured.

It is obvious that the elastic sealing member with the shaped profile of the sleeve can be easily assembled, since the shaped profile of the sealing member can be snapped in merely by stretching open. However, it becomes apparent on dismantling that the union of the sealing member with the sleeve need not necessarily remain in their original jointed state. When the plug-in union is released the end half of the sealing member remains in the sleeve under prestress while the joint union has already been released from the prestress exerted by the cylindrical interior surface of the outer housing. In this case, the sealing member may become released from the sleeve and remain within the internal diameter of the housing while the sleeve with the pipe to be sealed are pulled out of the housing. When reassembly is attempted, the joint union is no longer adequately produced and a sealed connection is no longer guaranteed.

SUMMARY OF THE INVENTION

It is an object of the present invention to provide a joint connection between an elastomeric seal and a push-in part of a plug-in coupling which can no longer release itself even in the event of frequent actuation of the plug-in connection.

In contrast to the above described prior art device, an elastomeric seal according to the present invention for sealing the pipe in a push-in part of a plug-in coupling relative to a cylindrical interior surface of a housing of that plug-in coupling is sealed by a positive-fitting joint connection that connects the elastomeric seal to the push-in part. An annular molding on the elastomeric seal is no longer drawn from the outside via a collar but snap-fitted from inside into an annular groove. As a result of the insertion of a pipe in the push-in part, the joint connection between the elastomeric seal and the push-in part is locked in that the annular molding of the elastomeric seal can no longer be pulled out from its annular groove because the exterior surface of the pipe prevents the radial inward movement of the annular molding. Accordingly, frequent actuation of the plug-in connection does not cause the elastomeric seal to be released from the push-in part. To improve this connection, the planning of the diameter relationships on a web-shaped connection in the annular molding and on the internal diameter of the collar interacting with the web-shaped connection may be sized to achieve a compression of the web-shaped connection whereby the above-mentioned locking is further improved.

According to an embodiment of the present invention there is described a push-in part and an elastomeric seal for use with a plug-in coupling including a housing having a cylindrical interior surface, the push-in part and the elastomeric seal being insertable with a pipe into the cylindrical interior surface for sealing a cylindrical and uninterrupted exterior surface of the pipe relative to the cylindrical interior surface of the housing. A radially outward-facing annular lip arranged on said seal is insertable in the cylindrical interior surface of the housing. A radially inward-facing annular lip arranged on said seal is insertable over the exterior surface of the pipe. The radially outward-facing annular lip is contactable with the cylindrical interior surface in a prestressed state and the radially inward-facing annular lip is contactable with the exterior of the pipe in a prestressed state when the push-in part is inserted with the pipe into the cylindrical interior surface. A positive fitting joint connection is arranged between the seal and the push-in part for connecting the seal to the push-in part. The positive fitting joint connection is non-releasable when the pipe is inserted through said radially inward-facing lip of said seal.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

In the drawings, wherein like reference characters denote similar elements throughout the several views.

DETAILED DESCRIPTION OF THE PRESENTLY PREFERRED EMBODIMENTS

Figure 1:
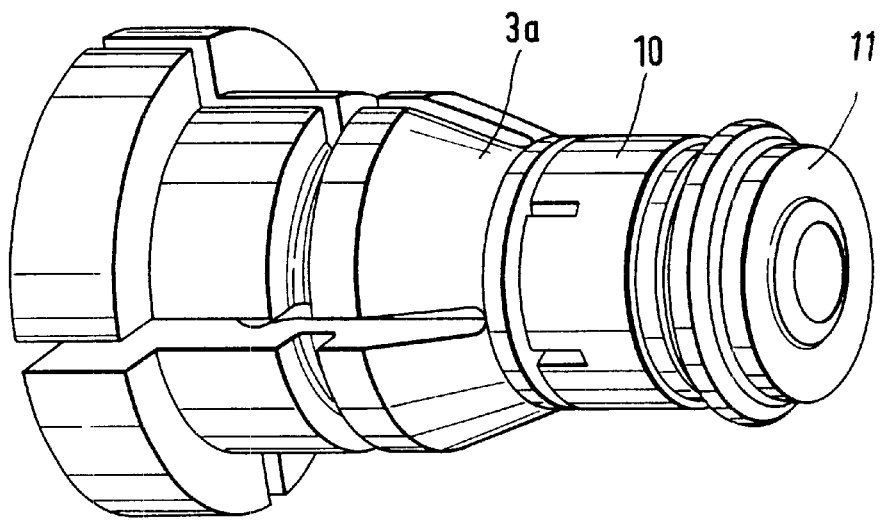
FIG. 1 is a perspective view of an assembly of a push-in part with an elastomeric seal including an assembly ring according to an embodiment of the present invention.
Figure 2:
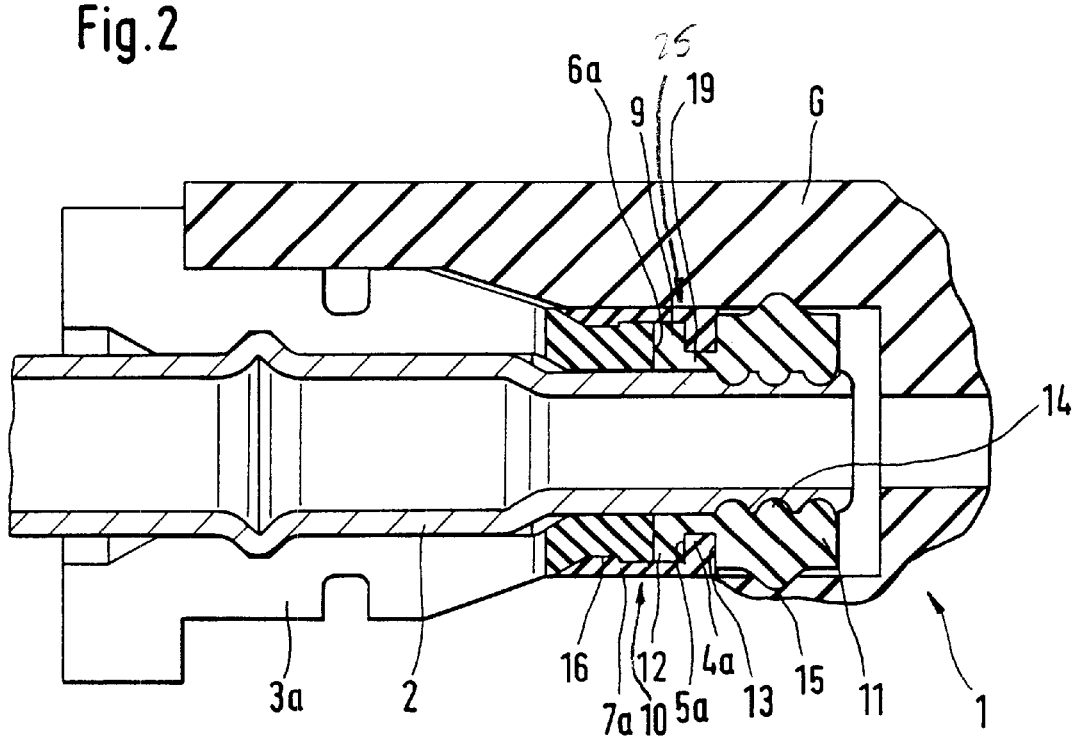
FIG. 2 is a partial longitudinal sectional view of the assembly of FIG. 1 with a pipe which is sealed by the seal relative to a housing.

FIG. 2 shows a plug-in coupling 1 for sealing a pipe 2 in a housing G. Referring also to FIG. 1, the end of the pipe 2 lies in a push-in part 3a to which an elastomeric seal 11 is connected to seal the pipe 2 relative to an interior surface of the housing G. The push-in part 3a, the elastomeric seal 11 and the pipe 2 thus form an assembly which is pushed, i.e. inserted, into the housing G to seal the pipe 2. The elastomeric seal 11 has a radial outward-facing annular lip 15 on its radial outer surface which is under prestress with the interior surface of a drilled hole in the housing G and an annular sealing lip 14 facing radially inward and lying on the radial interior surface of the elastomeric seal 11 under prestress with an exterior surface of the pipe 2. The elastomeric seal 11 is thus pressed into an annular gap on the exterior of the pipe 2 with elastic distortion to facilitate sealing of this annular gap.

On an axial side of the elastomeric seal 11 facing the push-in part 3a, an annular molding 12 projecting radially outward is connected to the elastomeric seal 11 via a web-shaped connection 19.

According to FIG. 2, the radially outward facing annular molding 12 is formed radially above the web-shaped connection 19 in an annular groove 9 and engages behind a collar 4a. The annular molding 12 is mounted in the annular groove 9 after assembly of the seal 11 on the push-in part 3a. The annular groove 9 is formed by an assembly ring 10 to which the collar 4a is connected and the push-in part 3a. The assembly ring 10 is fixed by its end face to the push-in part 3a and forms an annularly extending first plane surface 5a of the annular groove 9 on the collar 4a. The first annularly extending first plane surface 5a forms the annular groove 9 with an annularly extending second plane surface 6a on the push-in part 3a. The assembly ring 10 has an exterior radial connection 7a forming the radial exterior limit of this annular groove 9. The assembly ring 10 is nonreleasably connected to the push-in part 3a, so that it can no longer be pulled off the push-in part 3a even under the application of force.

Once the assembly ring 10 has been connected to the push-in part 3a, the seal 11 is joined into the annular groove 9 from inside by its radially outward-facing annular molding 12, thereby forming a joint connection 25. The elastomeric seal 11 and push-in part 3a thus assembled are separable from each other again by an axially separating force. In this condition, the molding 12 can, above a particular tensile force, be pulled out again from the annular groove 9, because the elasticity of the elastomeric material of the elastomeric seal 11 is not strong enough to adequately fix the molding 12 in the push-in part 3a. That is, if the seal 11 were pulled away from the push-in part 3a, the molding 12 would move inwardly and thereby release the seal 11 from the push-in part 3a. However, after insertion of the pipe 2 into the push-in part 3a and into the seal 11 joined thereto, the joint connection 25 between the push-in part 3a and the elastomeric seal 11 is locked. When the pipe 2 is inserted in the push-in part 3a and elastomeric seal 11, the molding 12 can no longer be released from the annular groove 9 because the molding 12 is prevented from moving radially inward by the exterior surface of the pipe 2 which now rests internally on the seal 11. To prevent the assembly ring 10 from being released from the push-in part 3a, a snap connection 16 is arranged thereon which permits dismantling of the assembly ring only by destruction or, alternatively, with the aid of special tools.

Figure 3:
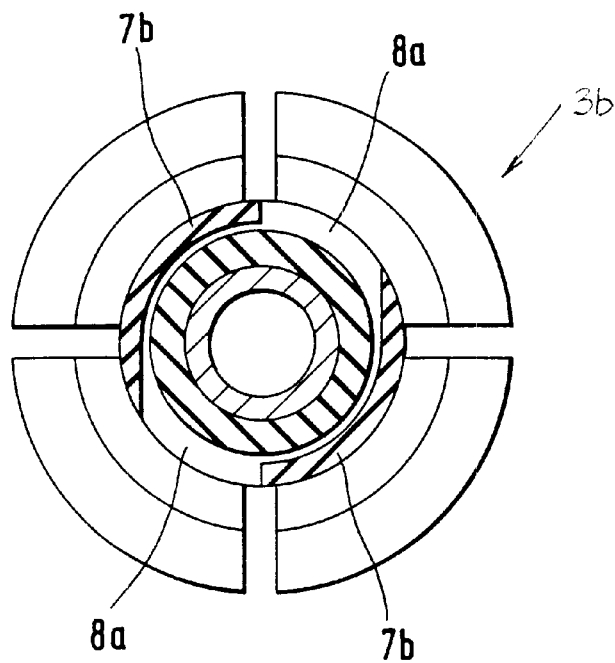
FIG. 3 is a cross-sectional view through line III—III of FIG. 4 showing a push-in part and elastomeric seal with gaps in the region of an annular groove.
Figure 4:
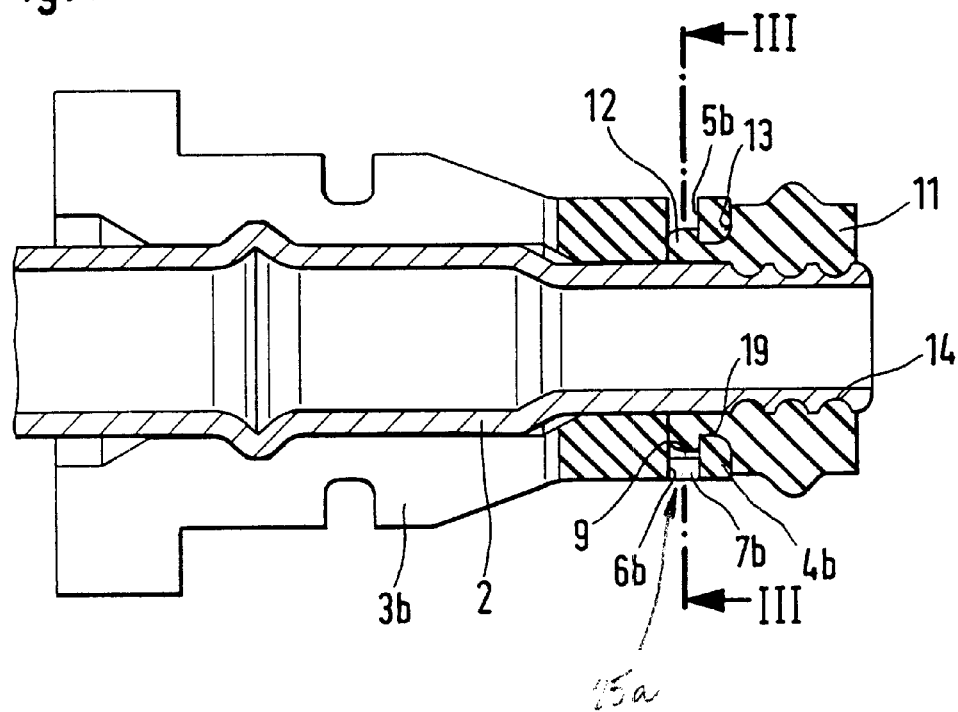
FIG. 4 is a partial longitudinal sectional view of an assembly of a push-in part and elastomeric seal of FIG. 3 with the pipe.

According to FIGS. 3 and 4, another embodiment of a push-in part 3b is proposed which is integrally designed with a collar 4b and a radially outward connection 7b. The annular groove 9 is produced on this integrally designed push-in part 3b during production by application of the injection molding method by outward-movable mold slides forming two plane surfaces 5b and 6b extending in an annular manner and a radially outward connection 7b having gaps 8a which are indispensable for removal of the radially outward-movable mold slides. An embodiment of the push-in part 3b produced in this way permits an unbroken annularly extending first plane surface 5b, as a result of which the force of retention between the seal 11 and the push-in part 3b is ensured, as was described previously with reference to FIGS. 1 and 2. The annular groove 9 is thus formed by the annularly extending first plane surface 5b and a second annular plane surface 6b which likewise extends unbroken circumferentially. The first plane surface 5b and second plane surface 6b are connected via the radial outward connection 7b which has the two gaps 8a. The locking of the joint connection 25a, i.e. the molding 12 in the annular groove 9, between the seal 11 and the push-in part 3b is likewise produced by the pipe 2, which is pushed into the push-in part 3b and elastomeric seal 11.

To improve the force of retention, an additional compression of the web-like connection 19 is also proposed, in that the radially inward-facing collar 4b is designed to be smaller in diameter than the external diameter of the web-shaped connection 19. This embodiment produces an annular surface on the inward facing collar 4b which is smaller than the annular surface of the web-shaped connection 19 which, in turn, forms an additional security against the seal 11 being pulled off from the push-in part 3b when the pipe 2 is pushed in. This compression of the web-shaped connection 19 may apply in general to all proposed embodiments of this invention.

Figure 5:
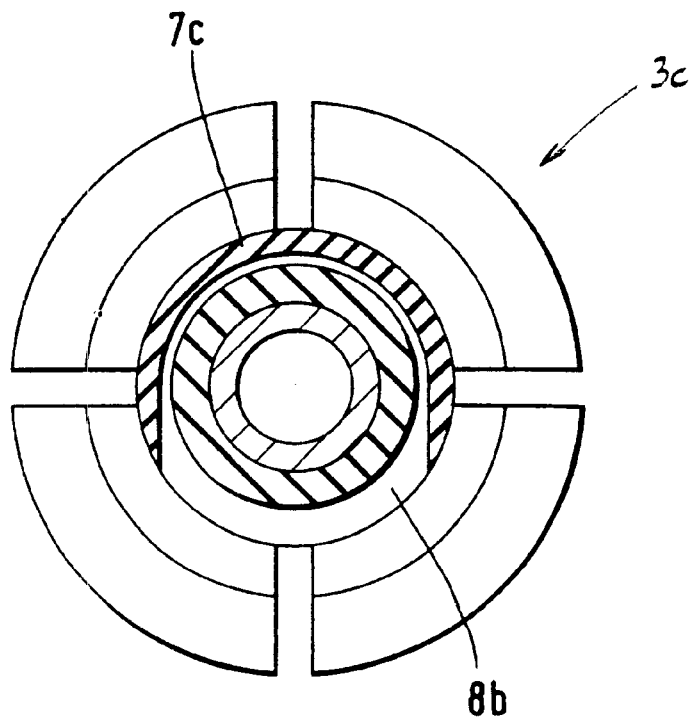
FIG. 5 is a cross-sectional view through line V—V of FIG. 6 showing another embodiment of the push-in part of FIG. 3.

The radially exterior connection 7b described above with reference to FIGS. 3 and 4 has two gaps 8a which are created using mold slides of identical design. In a further embodiment according to FIG. 5, a gap 8b in a radially exterior connection 7c of a collar 4c is shown which arises as a result of the unilateral designing of a mold slide to connect the collar 4c and produce the annular groove 9 extending circumferentially around at least half of one side. The gap 8b in the connection 7c is larger than one of the gaps 8a in the connection 7b according to FIGS. 3 and 4. However, the gap 8b does not influence the formation of an annularly extending first plane surface 5c and its unbroken nature or on the formation of an annularly extending second plane surface 6c and its unbroken nature, so that perfect jointing of the seal 11 to the push-in part 3c is guaranteed also by the adequately large formation of a radially outward connection 7c for the collar 4c.

Figure 6:
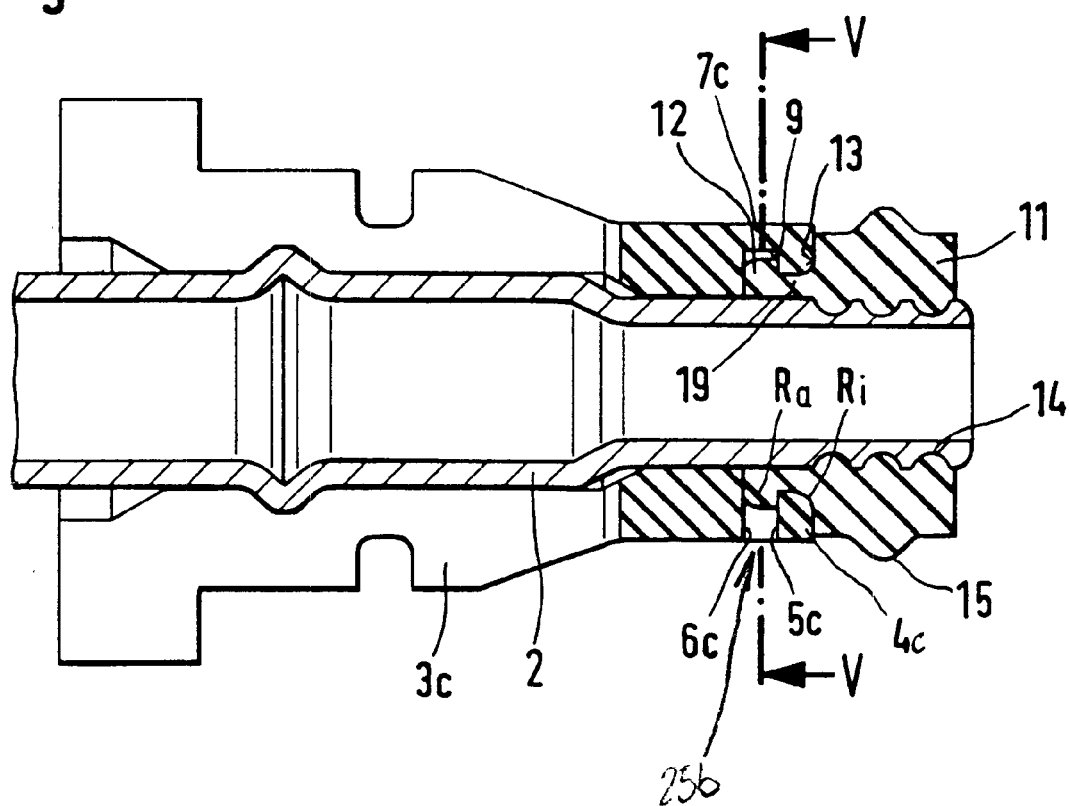
FIG. 6 is a partial longitudinal sectional view of an assembly of a push-in part and elastomeric seal of FIG. 5 with the pipe.

The push-in part 3c has an annularly extending sealing surface 13 on its end face against the seal 11 which has a radially inward-facing radius Ri. The annularly extending sealing surface 13 interacts with a radially outward-facing radius Ra on the annular molding 12 of the seal 11 upon assembly so that the seal 11 is more easily joined to the push-in part 3c. In this embodiment, the seal 11 is simply pressed axially against the push-in part 3c. As the seal 11 is axially pressed, the molding 12 is thereby deflected radially inward and snap fits to form a hook-shaped joint connection 25b into the annular groove 9 which can also withstand tensile stress. The sealing surface 13 is also present on the previously discussed embodiments and is shown in FIGS. 2, 4 and 6. As described above, this joint connection 25b is locked by the insertion of the pipe 2 into the assembly including the push-in part 3c and the seal 11.

Figure 7:
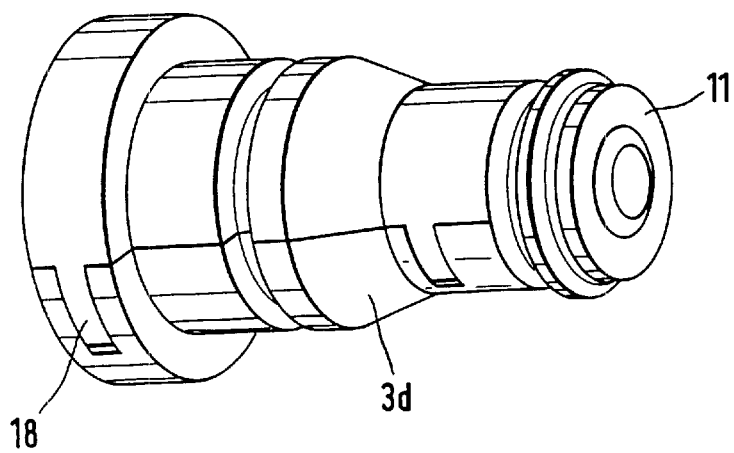
FIG. 7 is a perspective view of another embodiment of a push-in part divided into two parts by a plane extending along a median axis.
Figure 8:
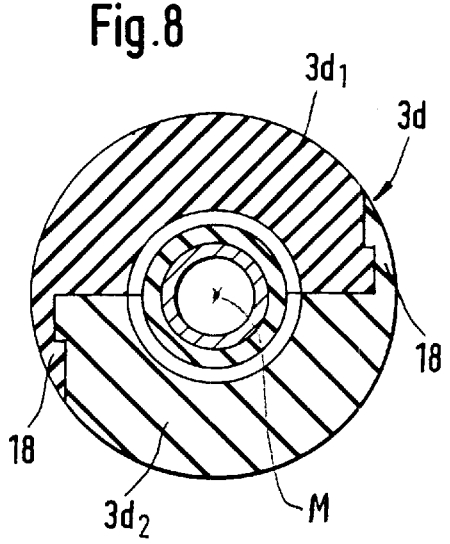
FIG. 8 is a sectional view of the push-in part according to FIG. 7.
Figure 9:
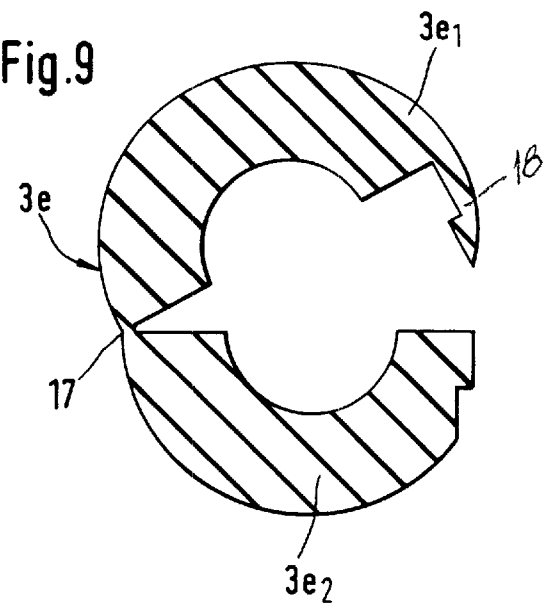
FIG. 9 is a sectional view showing an alternative embodiment of the push-in part of FIG. 7.

According to FIG. 7 a push-in part 3d is shown which can be joined to the seal 11 via a locking joint connection 25a, 25b, similarly to the previously described embodiments of the push-in parts 3c and 3b. Referring also to FIG. 8, the push-in part 3d is a two part push-in part in which the two parts are separated by a plane of separation along a median axis M of the push-in part 3d. Two identical halves 3d1 and 3d2 are joined to form the push-in unit 3d. An adequately strong joint union is produced by retaining lugs 18. In the push-in parts 3a–3c, i.e., the one part push-in units, the formation of the annular groove 9 causes production engineering difficulties. However, separating the push-in part into two halves facilitates a much simpler production of the annular groove 9. An alternative two part design is shown in FIG. 9 in which a push-in part 3e includes a first half 3e1 connected to a second half 3e2 via at least one film hinge 17. The closure of the two halves 3e1 and 3e2 is brought about analogously to the second embodiment of the push-in part 3d, via retaining latches 18.

Figure 10:
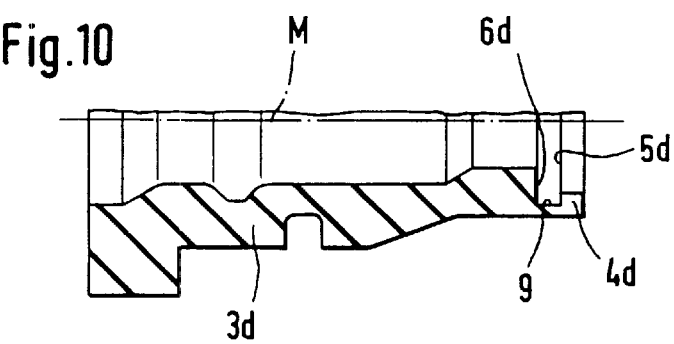
FIG. 10 is a longitudinal sectional view of a lower half of a push in part according to FIG. 7.

As shown in FIG. 10, the annular groove 9 is easy to produce in a two part push-in part 3d in the fully opened state and does not require the use of sliding molds. The annular groove 9 is produced in each half of push-in part 3d with first and second plane surfaces 5d and 6d designed unbroken and extending annularly, the first plane surface being formed by a collar 4d. The annular groove 9 may also be produced this way in the push-in part 3e of FIG. 9.

Figure 11:
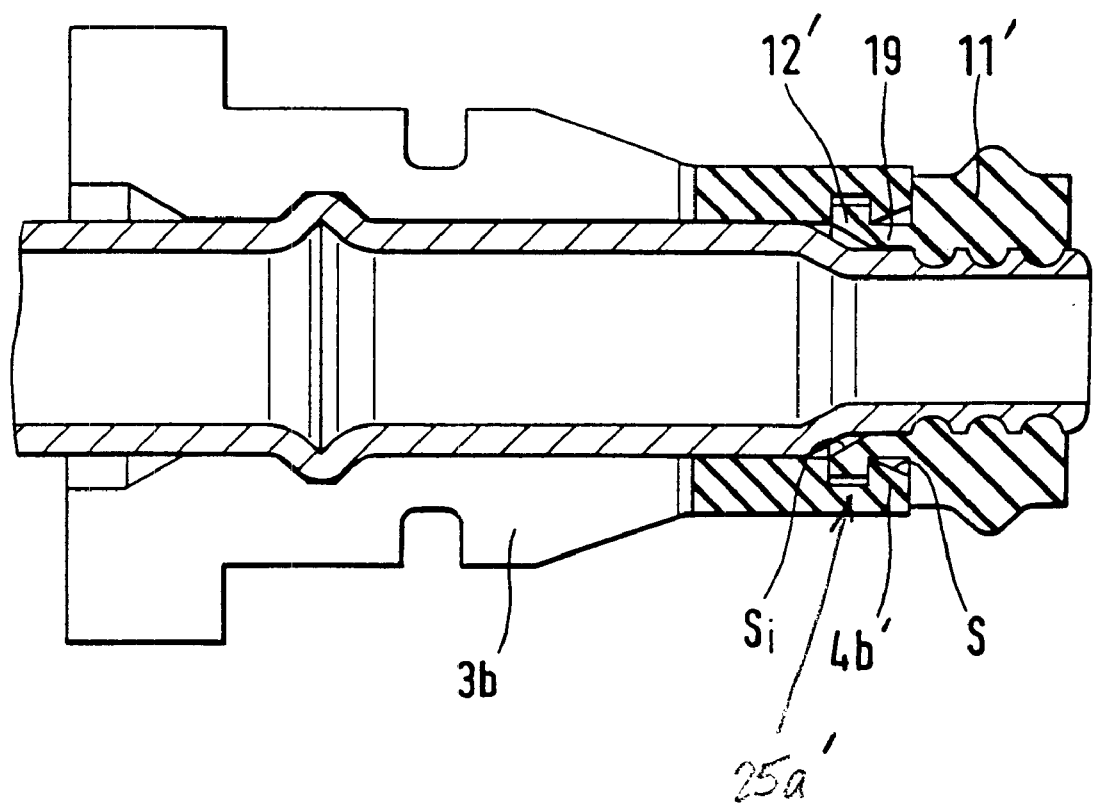
FIG. 11 is a longitudinal sectional view of a push-in part and seal according to another embodiment of the present invention.

According to FIG. 11, a joint connection 25a' is described which may be particularly incorporated with the push-in part 3b. In this embodiment, a radial inward facing surface of the collar 4b' has an oblique surface S which deflects the molding 12' radially inward as the seal 11' is axially pressed onto the push-in part 3b. The assembly is further facilitated by an internal oblique surface Si on the seal 11' which allows the molding 12' to recede when the collar 4b' is pushed therethrough. Additionally, the insertion of the pipe 2 through the push-in part 3b and the seal 11' is made more reliable by the oblique surface Si.

All embodiments disclosed herein have the common advantage that they possess a joint 25, 25a, 25b between the push-in part 3a, 3b, 3c, 3d, 3e and the seal 11 that is easy to assemble and which is locked by the insertion of the pipe 2 through the push-in part and the seal. In each of these embodiments, the joint connection 25, 25a, 25b is made additionally secure, with certain changes of diameter, by compression of the web-shaped connection 19.

The invention is not limited by the embodiments described above which are presented as examples only but can be modified in various ways within the scope of protection defined by the appended patent claims.

We claim:

1. A combination including a push-in part and an elastomeric seal for use with a plug-in coupling including a housing having a cylindrical interior surface, said push-in part and said elastomeric seal being connectable with a pipe to form a unit that is insertable into the cylindrical interior surface, said elastomeric seal effective for sealing a cylindrical and uninterrupted exterior surface of the pipe relative to the cylindrical interior surface of the housing, said combination comprising:

a radially outward-facing annular lip arranged on said seal and insertable in the cylindrical interior surface of the housing; and a radially inward-facing annular lip arranged on said seal and insertable over the exterior surface of the pipe, said radially outward-facing annular lip contactable with the cylindrical interior surface in a prestressed state and said radially inward-facing annular lip contactable with the exterior of the pipe in a prestressed state when the push-in part is inserted with the pipe into the cylindrical interior surface; and a positive fitting joint connection arranged between said seal and said push-in part for connecting said seal and said push-in part, said positive fitting joint connection being non-releasable only when the pipe is inserted through said radially inward-facing lip of said seal to form the unit with said push-in part and said elastomeric seal.

2. The combination of claim 1, wherein said push-in part further comprises a radially inward-facing collar that forms a first annularly extending plane face and a second annularly extending plane face which opposes said first annularly extending second plane face, said first and second annularly extending plane faces forming therebetween a circumferential, inward-facing annular groove, and said positive fitting joint connection comprising a radial outward projecting annular molding connected to said seal and engageable in the inward facing annular groove of said push-in part via a hook-type engagement.

3. The combination of claim 2, further comprising an assembly ring mountable on said push-in part, wherein said collar is arranged on said assembly ring and said annular groove is formed between said first annularly extending plane face on said assembly ring and said second annularly extending plane surface arranged on an end face of said push-in part, said assembly ring forming a radially outward end of said inward facing annular groove.

4. The combination of claim 3, wherein said external connection of said assembly ring to said push-in part comprises a snap connection.

5. The combination of claim 2, wherein said push-in part is an integral part formed by outward-movable slides such that said radially outward connection of said collar to said push-in part is interrupted by at least one gap.

6. The combination of claim 5, said collar on said push-in part has an inner radius (Ri) and a side of said collar facing toward said end face of said push-in part interacts with a radially outward facing radius (Ra) of said annular molding, wherein said inner radius is smaller that said outward facing radius.

7. The combination of claim 5, wherein said collar comprises a first oblique surface facing toward said end face of said push-in part and radially inward, said first oblique surface being arranged for interacting with said annular molding, and a radial inner of said annular molding comprising a second oblique surface operatively arranged for facilitating the recession of said molding in a radial inward direction during an axial insertion of said seal onto said push-in part.

8. The combination of claim 5, wherein said seal comprises a web-shaped connection connecting said annular molding to said seal, wherein said web-shaped section being arranged so that an inner annular surface of said collar compresses said web-shaped connection when the pipe is installed in said push-in part.

9. The combination of claim 2, wherein said push-in part comprises a first half and a second half which are separated by a plane of separation parallel to a median axis, wherein a half of said annular groove and a half of said collar are molded in each of said first and second halves of said push-in part.

10. The combination as claimed in claim 9, wherein said first and second halves of said push-in part comprise a jointed connection for holding said first and second halves together to form said push-in part.

11. The combination of claim 9, wherein said first half is identical to said second half.

12. The combination of claim 10, wherein said jointed connection of said first and second halves comprises a retaining latch.

13. The combination of claim 10, wherein said jointed connection of said first and second halves comprises a film hinge.

14. A method of forming a joint connection between a seal and a push-in part of a plug-in coupling for a pipe and locking the joint connection, wherein the seal has a radially extending annular molding, the method comprising the steps of:
  joining the seal to an assembly ring having a collar by inserting the radially outward-facing annular molding behind an annularly extending plane surface of the collar;
  snap-fitting the combination of the assembly ring and the seal onto the push-in part such that the annular molding abuts an end-face of the push-in part and is arranged in an annular groove formed between the end face and the collar;
  pushing the pipe into the push-in part and into the seal at least as far as a position at which the seal meets the push-in part to lock the annular molding in the annular groove formed between the collar and the end-face.

15. A seal for use with a plug-in coupling including a housing having a cylindrical interior surface and a push-in part, said push-in part and said seal being insertable with a pipe into the cylindrical interior surface for sealing a cylindrical and uninterrupted exterior surface or the pipe relative to the cylindrical interior surface of the housing, said push-in part having a radial inward-facing collar forming a first annular extending plane face, a second annular extending plane face opposing said first annular extending plane face, and a radial inward-facing annular groove arranged between said first annular extending plane face and said second annular extending plane face, said seal comprising:
  a radially outward-facing annular lip arranged on said seal and insertable in the cylindrical interior surface of the housing;
  a radially inward-facing annular lip arranged on said seal and insertable over the exterior surface of the pipe, said radially outward-facing annular lip contactable with the cylindrical interior surface in a prestressed state and said radially inward-facing annular lip contactable with the exterior of the pipe in a prestressed state when the push-in part is inserted with the pipe into the cylindrical interior surface; and
  a positive fitting joint connection comprising a radial outward projecting annular molding engageable in the annular groove of the push-in part via a hook-type engagement, said positive fitting joint connection being non-releasable when the pipe is inserted through said radially inward-facing lip.

16. The seal of claim 15, wherein a radial inner of said annular molding comprising an oblique surface operatively arranged for facilitating the recession of said molding in a radial inward direction during an axial insertion of said seal onto the push-in part.

17. The seal of claim 15, further comprising a web-shaped connection connecting said annular molding to said seal, wherein said web-shaped section is arranged so that an inner annular surface of the collar compresses said web-shaped connection when said seal is installed on the push-in part and the pipe is inserted through said push-in part.

* * * * *